(12) United States Patent  
Phillips et al.

(10) Patent No.: US 8,612,553 B2  
(45) Date of Patent: Dec. 17, 2013

(54) METHOD AND SYSTEM FOR DYNAMICALLY PURPOSING A COMPUTING DEVICE

(75) Inventors: Thomas G. Phillips, Bellevue, WA (US); Kartik N. Raghavan, Seattle, WA (US); Paul C. Sutton, Bellevue, WA (US); Ryan W. J. Waite, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 3715 days.

(21) Appl. No.: 10/059,469

(22) Filed: Jan. 29, 2002

(65) Prior Publication Data

US 2002/0091805 A1 Jul. 11, 2002

Related U.S. Application Data

(63) Continuation-in-part of application No. 09/713,740, filed on Nov. 15, 2000.

(60) Provisional application No. 60/176,231, filed on Jan. 14, 2000.

(51) Int. Cl.
*G06F 15/177* (2006.01)

(52) U.S. Cl.
USPC ............................. 709/220; 707/968; 707/972

(58) Field of Classification Search
USPC ........................................................ 709/220
See application file for complete search history.

(56) References Cited

U.S. PATENT DOCUMENTS

| | | | |
|---|---|---|---|
| 5,410,699 A | 4/1995 | Bealkowski et al. | |
| 5,432,927 A * | 7/1995 | Grote et al. | 713/2 |
| 5,485,579 A * | 1/1996 | Hitz et al. | 709/221 |
| 5,692,190 A | 11/1997 | Williams | |
| 5,708,776 A * | 1/1998 | Kikinis | 714/55 |
| 5,787,491 A | 7/1998 | Merkin et al. | |

(Continued)

FOREIGN PATENT DOCUMENTS

| | | |
|---|---|---|
| EP | 0 917 060 A1 | 5/1999 |
| WO | WO 95/22794 | 8/1995 |

OTHER PUBLICATIONS

Stevens et al., *"El Torito": Bootable CD-ROM Format Specification Version 1.0*, Phoenix Technologies and IBM, pp. 1-20 (1994).

(Continued)

*Primary Examiner* — Azizul Choudhury

(57) ABSTRACT

A system and method for purposing a computing device is disclosed. The computing devices in a network are organized into groups referred to as Pods, each Pod of computing devices further comprising an aggregation node. The aggregation node monitors and controls the computing devices in the Pod. The aggregation node is used to copy a system image from the pristine partition of another computer device or from a library of system images to a target partition of the computer to be repurposed. Because the computing devices in the network are organized into Pods, with each Pod having an aggregation node, there is no single point of failure for the entire management and control of the network. The aggregation nodes for each Pod in the network can communicate with one another to most efficiently allocate resources among the various tasks to be performed by the computing resources in the network. Computing devices in the network can be repurposed and/or reassigned to different Pods based on the various criteria.

17 Claims, 6 Drawing Sheets

(56) References Cited

U.S. PATENT DOCUMENTS

| | | | |
|---|---|---|---|
| 5,802,363 A | 9/1998 | Williams et al. | |
| 5,974,563 A * | 10/1999 | Beeler, Jr. | 714/5 |
| 5,978,912 A * | 11/1999 | Rakavy et al. | 713/2 |
| 6,098,158 A | 8/2000 | Lay et al. | |
| 6,158,002 A | 12/2000 | Kwan et al. | |
| 6,170,055 B1 | 1/2001 | Meyer et al. | |
| 6,247,109 B1 * | 6/2001 | Kleinsorge et al. | 712/13 |
| 6,279,109 B1 * | 8/2001 | Brundridge | 713/2 |
| 6,289,449 B1 | 9/2001 | Aguilar et al. | |
| 6,304,965 B1 | 10/2001 | Rickey | |
| 6,308,264 B1 | 10/2001 | Rickey | |
| 6,308,265 B1 | 10/2001 | Miller | |
| 6,317,826 B1 * | 11/2001 | McCall et al. | 713/1 |
| 6,347,371 B1 | 2/2002 | Beelitz et al. | |
| 6,381,694 B1 | 4/2002 | Yen | |
| 6,421,777 B1 * | 7/2002 | Pierre-Louis et al. | 713/2 |
| 6,449,716 B1 | 9/2002 | Rickey | |
| 6,535,977 B1 | 3/2003 | Holle et al. | |
| 6,560,701 B1 | 5/2003 | Berstis et al. | |
| 6,578,068 B1 | 6/2003 | Bowman-Amuah | |
| 6,591,376 B1 | 7/2003 | VanRooven et al. | |
| 6,658,563 B1 | 12/2003 | Ice, Jr. et al. | |

OTHER PUBLICATIONS

Lawson, M., et al., "Reconfiguration Techniques of a Mobile Network", *in Proceedings the 1980 International Zurich Seminar on Digital Communications, IEEE Catalog* No. 80CH1521-4, pp. B10. 1-B 10.4 (Mar. 1980).

Burns, A., et al., "Dynamic Change Management and Ada", *Journal of Software Maintenance: Research and Practice*, vol. 1, No. 2, pp. 121-131 (Dec. 1997).

Banker, R., et l., "A Field Study of Economies in Software Maintenance", *Management Science*, vol. 43, No. 12, pp. 1709-1725 (Dec. 1997).

* cited by examiner

METHOD AND SYSTEM FOR DYNAMICALLY PURPOSING A COMPUTING DEVICE

RELATED APPLICATIONS

This application is a continuation-in-part of U.S. application Ser. No. 09/713,740 filed on Nov. 15, 2000, entitled "Method and System For Dynamically Purposing A Computing Device," which in turn claims priority from U.S. Provisional Application Ser. No. 60/176,231 filed on Jan. 14, 2000, entitled "Dynamic Server Re-purposing (DSRP)."

TECHNICAL FIELD

This invention relates generally to purposing of computing devices and, more particularly, relates to a method and system for dynamically purposing computing devices.

BACKGROUND OF THE INVENTION

Typically a computing device is capable of serving one or more purposes defined by the operating system used by the computing device and one or more application programs that are installed on the computing device. To purpose a computing device, a user typically has to sequentially and manually install an operating system, install one or more application programs, and configure the operating system and application program to work with each other. Additionally, in some but not all operating system environments, such as the WINDOWS® NT and WINDOWS® 2000 operating system environments, when the computing device is added as a node in a secure network environment, the user has to ensure that a unique security identifier is properly generated and assigned to the computing device. This process can be very time consuming depending on the complexity of the operating system and application program in question, and more typically requires complex scripts and custom development.

Moreover, it is not uncommon in a corporate or commercial setting that this process has to be repeated for hundreds or thousands of computing devices.

One situation in which there is a need to purpose hundreds or thousands of computing devices is an Internet Service Provider (ISP) or Application Service Provider (ASP). As one example, an ISP may have contracts with hundreds or thousands of customers to design, implement and/or operate the customers' web sites. For each customer, the ISP will purpose one or more web servers to provide the client's web site needs. Each customer, however, is likely to have varying amounts of traffic to its web site, depending on numerous factors including the time of year, or special occasions or events. Each customer needs to be assigned a sufficient number of servers to cope with reasonably expected peak traffic to the web site, although it is unlikely that every customer will experience peak traffic to its web site at the same time.

This arrangement is expensive for both the customer and the ISP because, except during periods of peak use, the computing devices are likely to be underutilized. Thus, the ISP has to maintain computing devices that are underutilized most of the time.

Similarly, the customer has to pay for computing devices that are not efficiently used at all times. Because repurposing a computing device is such a difficult and time consuming procedure, once a computing device is purposed for a particular customer the ISP is unlikely to repurpose the computing device during periods when it is underutilized. It is difficult, therefore, for an ISP to reallocate computing devices based on a customer's current computing needs.

The time consuming nature of purposing computing devices is also troublesome to an ISP when a particular computing device experiences a failure or error. For example, if the computing device has to be replaced, the ISP has to manually install an operating system, an application program and configure a new computing device to replace the one that failed. This process may take hours to complete, and in the meantime a customer web site may experience problems such as being completely down, being unduly slow, losing sales, etc.

Another situation in which there is a need to purpose hundreds or thousands of computers is when, for example, a large corporation purchases many computing devices and needs to purpose those computers for its employees. Every computer will have to be individually configured after manually installing an operating system and any desired application programs. There are methods to somewhat automate this process by "burning" the system image on the hard drives of the computers in an assembly line fashion. The process is still onerous and time consuming however, because the hard drives will have to be physically removed and reinserted into the computers.

application Ser. No. 09/713,740 filed on Nov. 15, 2000, entitled "Method and System For Dynamically Purposing A Computing Device," to which the present application is a continuation-in-part, describes a system and method for overcoming the shortcomings described above. The disclosure of the '740 application is hereby incorporated in its entirety. The method and system disclosed in the '740 application allows for dynamically purposing a computing device, such as a general-purpose desktop computer or a server, that is added to a network environment or that is already a part of the network. In this manner, for large computing customers, computing nodes can be repurposed on an ongoing basis.

The system and method of the '740 application uses a library of preconfigured system images that may be comprised of one or more operating systems and/or one or more application programs. A controller monitors all the computers on the network and repurposes any computers as desired or necessary. The controller is responsible for managing and controlling a repurposing operation, which includes transfer of a selected system image from the library of system images to a designated computer.

SUMMARY OF THE INVENTION

In the system and method of the present invention, the computers (which may also be referred to as computing devices, computing nodes, or nodes), are organized into groups, referred to as "Pods." Each Pod of computing devices is monitored and controlled by a computing device herein referred to as an "aggregation node." The aggregation node is responsible for monitoring and managing the computing devices in the Pod and for communicating, cooperating, and generally interacting with the aggregation nodes of the other Pods that comprise the entire network. The aggregation node for each Pod may be selected by the members of the Pod through, for example, an election process.

Each computing node in the network can be dynamically repurposed (or purposed for the first time) as explained herein. Because the computing devices in the network are organized into Pods, and each Pod has its own aggregation node responsible for monitoring and controlling the computing devices that comprise the Pod, there is no single point of failure for monitoring and managing all the nodes within the network. If one aggregation node experiences a failure, error, or down time, the rest of the network is not affected. Moreover, the computing devices in the Pod with the failing aggregation node can then select a new aggregation node from the members of the Pod without affecting the activity of the rest of the network.

Dynamically purposing (or repurposing) a computing device is referred herein as purposing (or repurposing) a computing device without the need of manually and/or sequentially installing and configuring an operating system and one or more application programs. Therefore, when a computing device is dynamically purposed (or repurposed), a system image, which may be comprised of an already configured operating system and/or one or more application programs, is transferred to a computer within a single process. Following this transfer, the computer can be restarted, resulting in a computing node that is now repurposed for a new computing role. This transfer is facilitated by using a preconfigured system image, which may consist of one or more operating systems and/or one or more application programs. The preconfigured system image may be selected and copied from the pristine partition of any computing device on the network or from a library of system images. Consequently, the need to manually and/or sequentially install and configure an operating system and one or more application programs on each computer added to the network is eliminated.

As a result of the invention, the computing devices that comprise the, for example, ISP or ASP network can be dynamically repurposed (or purposed for the first time) based on the needs of the ISP and its customers. Moreover, computing devices that comprise the network can be easily reorganized as necessary. For example, a computing device that is assigned to a particular Pod with a particular aggregation node may be repurposed and, perhaps, at the same time assigned to a different Pod with a different aggregation node to monitor and control the computing device.

As a result, the total number of computing devices necessary to meet the expected load capacity is greatly reduced. For example, in a typical ISP center, the number of computing devices is reduced from the number of devices necessary to accommodate the maximum load on every site at the same time, to the number of devices necessary to accommodate the typical load on every site. This can be exemplified in the following manner:

An ISP that hosts 100 varied sites deploys 1150 computers. This figure is based on the maximum load of the following customer sets:
  25 sites with 4 machines per site=100 (max load 4, average load 1)
  50 sites with 6 machines per site=300 (max load 6, average load 2)
  25 sites with 30 machines per site=750 (max load 30, average load 10)

Using the present invention, the same ISP could accommodate its customers with a fraction of the computers. Instead of purchasing 1150 computers, the ISP can instead purchase, for example, approximately 400 computers, which includes a buffer for absorbing load increases. As an end result, the invention reduces the ISP operating costs, simplifies the management of the site, and enables capacity beyond what would have previously been obtained with 400 computers.

The invention may also use a facility for remotely installing a default operating system on computers that are connected to the network. Included in the initial default operating system installation is a service for managing the computing device as a node on the network.

In one embodiment, a repurposable computer connected to the network has a hard disk with a Master Boot Record, a default partition, a target partition, and a pristine partition. The default partition includes a copy of the default operating system that is installed on the hard disk when the computer is first connected to the network, for example, through a LAN. The hard disk also includes a target partition for receiving a system image. The system image installed or to be installed on the target partition is essentially the purpose the computing device is to perform in the network, e.g., web server for a particular company or SQL server, etc. Once the system image is installed on the target partition, the computer boots from the target partition and runs the operating system and/or application program on the target partition. The pristine partition includes a pristine copy of the system image that is running on the target partition, which is available for copying or transfer to other computers or to the target partition.

In another embodiment of the invention, a repurposable computer connected to the network need not have a hard disk, or the hard disk need not have one or more of the, default partition, target partition or the pristine partition. Instead, the files, data and/or programs that would otherwise be located on a hard disk of the repurposable computer can alternatively be located on other devices, nodes, or hard disks on the network that are remote from the repurposable computer. As an illustrative example, and not to limit the scope of the invention, the repurposable computer may access and run the default operating system from a remote network location (e.g., another server, computing node, or hard disk).

In accordance with the invention, instead of staffing computer processing requirements for a peak level, one can add or remove computing capacity from a pool of available resources. Thus, the invention can be used to repurpose computers within a data center or network to meet capacity, load or customer requirements. The invention also enables quick and efficient recovery from a failure. If a computer fails, a new repurposable computing device can quickly be installed with a system image to run the same operating system and application program as the computer that failed.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
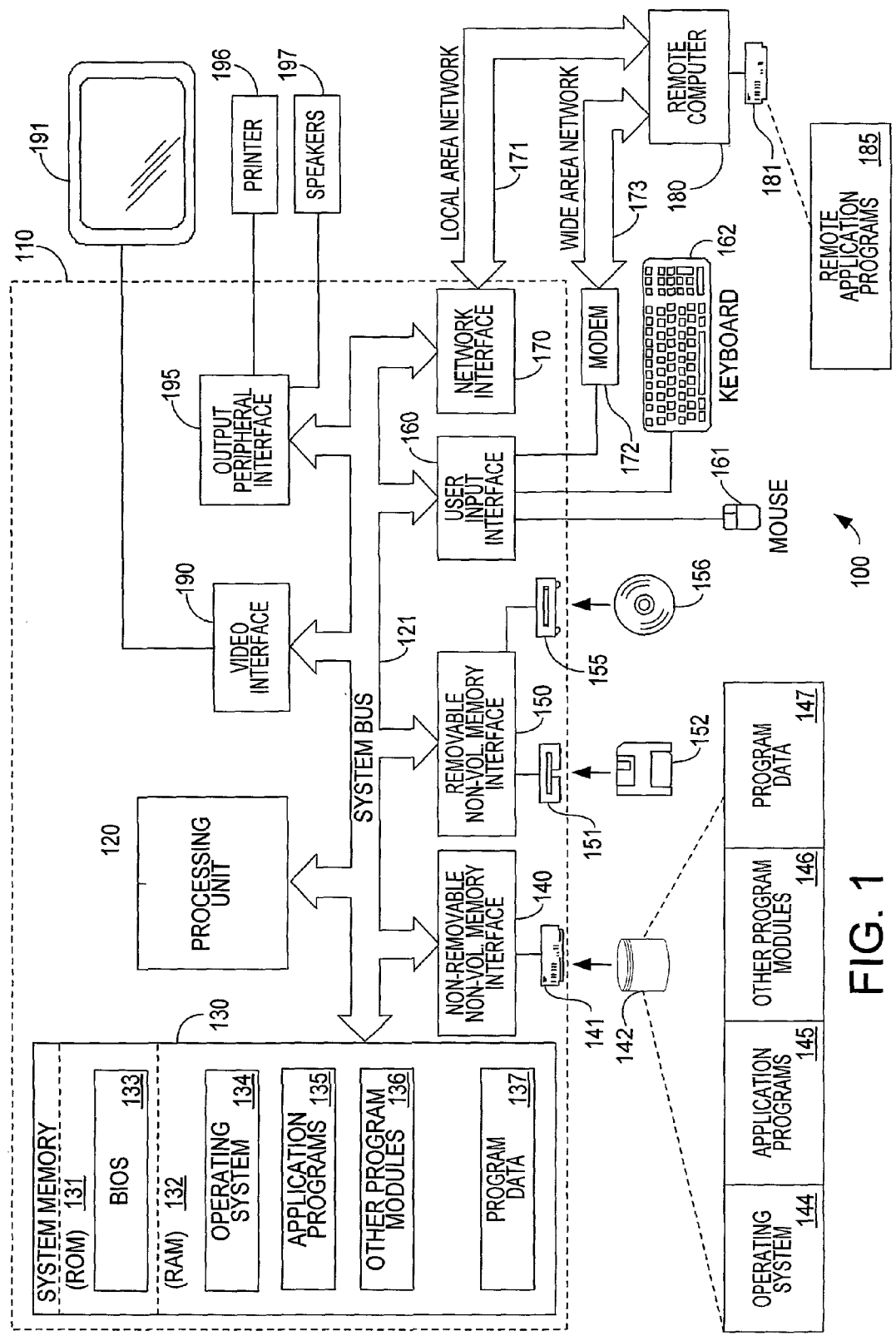
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media (i.e., hard disk) 142, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk 142 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown)-may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
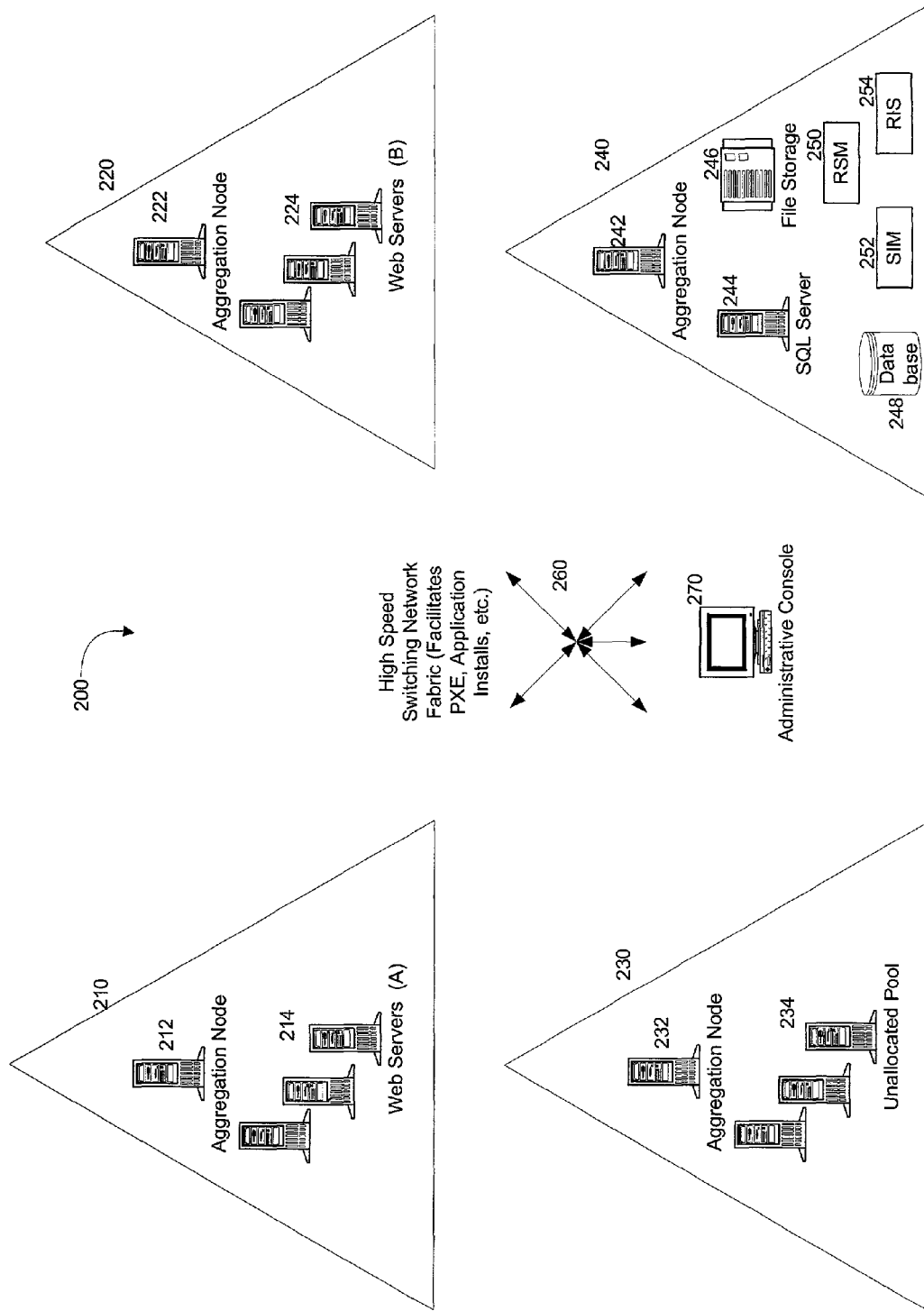
FIG. 2 is a block diagram of an implementation of the invention in a typical network environment.

FIG. 2 is a block diagram of a typical network 200 found in an ISP data center that may use the method and system of the present invention. The figure is intended to depict the operational relationship of the various components of the network and not the actual physical layout. The invention, however, is not limited to a network in an ISP data center and is applicable to any networked environment.

The network 200 is comprised of one or more Pods of computing devices 210, 220, 230 and 240 which are connected through a LAN 171. The LAN 171 may more specifically be comprised of a high-speed switching network fabric 260 that can facilitate the Portable (or Pre-Boot) eXecution Environment (PXE) and remote operating system and application installs.

The Pods of computers in the ISP data center network 200 may generally be comprised of one or more repurposable computers that have been installed with an operating system and application program to provide the services desired by the ISP's customers. For example, one or more repurposable computers 214 may comprise the Pod 210 and installed with an operating system and application program to act as web servers for customer A, while a different repurposable computer or computers 224 may comprise the Pod 220 and installed with an operating system and application program to act as web serves for customer B. Each one of the repurposable computers in the network 200, whether it is a member of a Pod or not, may be considered as a separate node in the secure network that comprises the ISP data center.

The Pods of computing devices 210, 220, 230, 240 in the network 200 have aggregation nodes 212, 222, 232, 242, respectively, for monitoring and managing the members of the Pod, including managing the repurposing of the member computing devices. In addition to monitoring and managing the nodes in their Pods, the aggregation nodes communicate with one another in order to determine the status of the other Pods, the resources available in the network (e.g., which computing devices are idle or inefficiently used), and any other tasks necessary for the resources on the network 200 to reliably and efficiently operate. Because the individual nodes in the network 200 are organized into Pods, each with its own aggregation node, there is no single point of failure in the monitoring and management of devices in the network. For example, if the aggregation node 212 in the Pod 210 experiences a failure or error, the monitoring and managing of the repurposable computers or nodes in other Pods in the network is not affected.

The aggregation node for each Pod may be a computing device and may be a separate node on the secure ISP data center network 200. Although the following discussion will specifically refer to aggregation node 212 of the Pod 210, it is equally applicable to any aggregation node for any Pod of computing devices in the network 200. The aggregation node 212 monitors the status of each of the repurposable computers 214 that comprise the Pod 210. The aggregation node 212 monitors and manages the computers 214 through the managed node service (MNS) 314 that may be installed on each of the hard disk 142 of the repurposable computers 214 of the Pod 210. The MNS periodically sends a status report to the aggregation node 212 updating the aggregation node as to the status of the repurposable computer. As part of monitoring and managing the computing devices within the Pod 210, the aggregation node 212 may optimize the use of, for example, hardware and software resources that comprise the Pod.

Each aggregation node in each Pod of computing devices is also responsible for communicating with the other aggregation nodes in the other Pods of computing devices in the network 200. In this manner, the aggregation node 212, for example, can also obtain information as to the status of the other computing devices and nodes that comprise the network 200. Through communicating with each other, the aggregation nodes of the network 200 may optimize the use of, for example, hardware and software resources that comprise the network 200.

The MNS may also support various services and/or policies that are necessary or desirable for the operation of the entire network 200. For example, the MNS may support a service that allows for storing user and machine accounts, storing information about resources and grouping network resources into various categories. For example, in the WINDOWS® 2000 operating system, the MNS may support the Microsoft Active Directory™ service. The MNS, however, is not limited to supporting or using only the Active Directory™ service or to services and/or policies only supported by the WINDOWS operating system. As other examples, the MNS may store load trends, failure causes, history of use and use this data to perform, for example, load trend analysis or failure analysis.

The aggregation node 212 may be selected from among the repurposable computers 214 that comprise the Pod 210. There are many different programs, routines and policies that are well-known to those with ordinary skill that can be used to select the aggregation node 212 from among the repurposable computers 214. As an example, one method of selecting or electing an aggregation node 212 is to choose the repurposable computer that has been a member of the Pod for the longest time. The invention, however, is not limited to the computers 214 choosing a new aggregation node from among themselves. Instead, the repurposable computers 214 may select or elect any available computing device or resource in the network 200 to be the new aggregation node 212 for the Pod 210.

Moreover, the selection or election of the new aggregation node 212 need not necessarily be performed by the computers 214. Instead for example, the aggregation nodes for the other Pods in the network may select or elect a new aggregation node for the Pod 210. It is to be understood that the invention is broad enough to encompass any method or policy for selecting or electing a new aggregation node for the first time or to replace an aggregation node that has experienced an error, failure, etc.

Additionally, it is to be understood that the aggregation node 212 may or may not also perform the function performed by the other computing devices in the Pod 210. For example, in FIG. 2 the repurposable computers 214 in the Pod 210 have been purposed to function as web servers for customer A. The aggregation node 212 may also be purposed to function as a web server for customer A, as well as perform the duties of the aggregation node. Alternatively, the aggregation node 212 may only perform the functions of the aggregation node and not be purposed to function as a web server for customer A. Whether the aggregation node 212 also performs the same purpose as the other repurposable computers 214 in the Pod 210 is a matter of design choice and may depend on factors including, but not limited to, the number of repurposable computers that are members of the Pod and must be monitored and controlled, the purpose served by the members of the Pod, and/or any other factors that may be pertinent.

As shown in FIG. 2, the network 200 may also include a pool of unallocated repurposable computers 234 that can be purposed for any task. The pool of unallocated computers 234 along with the aggregation node 232 comprise the Pod 230. The invention, however, is not so limited and the unallocated computers may be broadly applied across the network without all unallocated computers comprising a Pod 230 of unallocated computers. If the unallocated computers 234 are organized into a Pod 230 with an aggregation node 232, network traffic can be reduced. In such a configuration, the aggregation node 232 monitors and manages the pool of unallocated computers 234 and communicates with the other aggregation nodes on the network. If the pool of unallocated computers 234 is not grouped into a Pod with its own aggregation node, then each individual computer 234 potentially has to communicate with each aggregation node and thereby increase communications traffic on the network infrastructure.

In a typical ISP data center network, the one or more repurposable computers generally contain and provide high level information in various formats such as, for example, Hyper Text Markup Language (HTML) or Active Server Pages (ASP). The repurposable computers in turn may access and utilize more detailed information stored in the collection of computing devices 240 through the high speed switching network fabric 260. The collection of computing devices 240 may include any number or type of devices necessary to support the operation of the repurposable computers. By way of example and not limitation, the collection of computing devices 240 may include one or more SQL servers 244, one or more file storage devices 246, one or more data bases 248, one or more remote storage management services 250, one or more library of system images 252, and/or one or more installation services 254. The collection of computing devices 240 are accessible to the group of repurposable computers, but may not be accessible to computers that are not part of the secure network realm that comprise the ISP data center 200. For example, if one of the web servers 214 is accessed and requested to provide detailed product specifications, the web server 214 may query the SQL server 244 to obtain and provide the requested information. The Pod/aggregation node model can also be applied to other device types such as pagers, cell phones and or any other type of device capable of sending and receiving data.

The collection of computing devices 240, may also be organized into a Pod of computing devices if necessary or desired. The Pod 240 also comprises an aggregation node 242 that is responsible for monitoring and controlling the SQL servers 244, File Storage devices 246, data bases 248, RSMs 250, system image libraries 252, installation services 254, or any other devices that are included within the Pod 240. The Pod 240 can include any of these devices and need not include all of them. For example, the Pod 240 may include the devices 244, 246, 248, and 250, while the system image library 252 and installation service 254 may be on separate, independent computing devices or other hardware that are associated with another Pod or not part of any Pod within the network.

The Pods that comprise the network 200 may be organized in any manner desired. In one embodiment, the computing nodes in the network 200 may be organized into Pods based on their purpose. For example, all web serves for customer A are organized into one Pod, while all web servers for customer B are organized into a second Pod. In another embodiment, however, computers that have different purposes may be members of the same Pod. For example, computers that are purposed as web servers for customer A and computers that are purposed as web servers for customer B may be members of the same Pod. Such a situation may be desirable, for example, when the number of repurposable computers assigned to customers A and B is not relatively large. In such a situation, it may be more efficient and/or desirable for a single aggregation node to monitor and control the computers that are purposed to function as web servers for customers A and B. Yet another method of organizing Pods may be by network connection type and/or bandwidth capability. Thus, as understood by those with ordinary skill in the art, the repurposable computers in the network may be organized into Pods in any manner desired. It is desirable, although not necessary, that all computers purposed for the same function be part of the same Pod of computers controlled and monitored by the same aggregation node.

Figure 3:
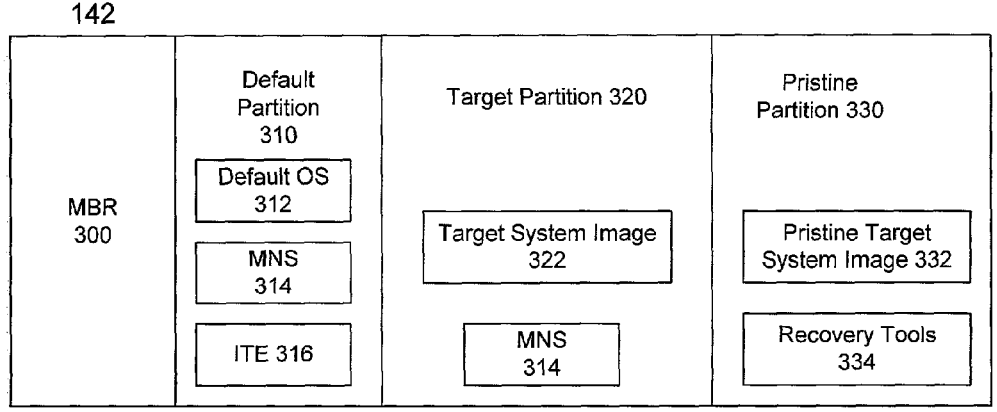
FIG. 3 is a schematic diagram of the hard disk on a repurposable computer.

FIG. 3 is a schematic diagram of a representative hard disk 142 of the one or more repurposable computers, or any other device which may be a node on the network 200. The hard disk 142 includes a Master Boot Record (MBR) 300 and several partitions. The MBR generally includes a map of the hard disk, including the location of the partitions and information with respect to which partition is the active partition. The default partition 310 includes a copy of a default operating system 312, the Managed Node Service (MNS) 314, and any necessary image transfer engine program modules 316 to perform a system image transfer—e.g., from the library of system images 252 or from the pristine partition 330 of any repurposable computer—to the target partition 320 and pristine partition 330. Alternatively, the image transfer engine program modules 316 may reside on any partition of the hard disk 142 so long as a system image can successfully be transferred to the target partition 320 and pristine partition 330. The target partition 320 may include a copy of the MNS 314 and a target system image 322. The target system image 322 includes the preconfigured operating system and/or application program(s) that defines the purpose of the computer. The hard disk 142 may also, but is not required to, include a pristine partition 330 that includes a pristine copy 332 of the target system image 322 running on the target partition. The pristine copy 332 of the target system image on the pristine partition 330 may be copied to the target partition 320 if, for example, the target system image 322 running on the target partition experiences an error or failure, or is otherwise corrupted. Additionally, the pristine target system image 332 on the pristine partition 330 is available for transfer and/or copying to other repurposable computers that are part of the network 200. The pristine partition 330 may also include recovery tools 334 that may be used in the event that the computer experiences an error or failure.

Moreover, the hard disk 142 may have more than one target partition 320 or pristine partition 330. In such an arrangement, different target system images 322 may be stored on each target partition, or different pristine target system images 332 may be stored on each pristine partition 330, and the computer may be repurposed by changing the target partition from which the computer boots. This arrangement may be useful, for example, if the sequence of repurposings is known in advance. As well, this arrangement may be useful in combination with probability and/or statistical analysis as to which repurposing operation will be required next. Thus, images may be stored on the additional target partitions or pristine partitions based on such a probability and/or statistical analysis. Those with ordinary skill in the art recognize that the invention is not limited to a hard disk and may be implemented on any computer readable storage medium such as RAM, EPROM, optical storage medium, etc.

In another embodiment of the invention, one or more of the repurposable computers need not have a hard disk, or the hard disk need not have the configuration of partitions discusses above. In such an embodiment, any single one or all of the partitions that contain the default system image, the target system image or the pristine system image may be remote from the computing node itself. As an illustrative example, instead of operating the default target partition from the hard disk on the computing device itself, the computing node may access and run the default target partition from a location on the network that is remote from the computing node. Similarly, the target and/or pristine system images may also be on partitions that are at locations on the network which are remote from the computing device.

FIG. 3 shows that the MNS 314 is located on both the default partition 310 and the target partition 320. This is because the MNS is always running on each of the repurposable computers, regardless of the partition from which the repurposable computer is running. When the repurposable computer is running the operating system on the default partition, the MNS on the default partition is used to communicate and interact with the aggregation node. Alternatively, when the repurposable computer is running the target system image 322 on the target partition 320, the MNS on the target partition is used to interact and communicate with the aggregation node.

When an aggregation node performs a repurposing operation on one of the repurposable computers, the MNS program module 314 is responsible for the receiving side of the system image transfer to the computer. Specifically, the MNS completes the system image transfer on to the target partition of the hard disk 142 of the repurposable computer and, if the transfer is successful, changes the master boot record 300 to cause the next machine boot process to occur from the target partition 320.

As part of the system image transfer, a copy of the MNS 314 is installed on to the target partition 320. This task can be accomplished in a variety of ways. For example, the images in the system image library 252 or on the pristine partition 330 may include a copy of the MNS. The MNS is then copied and installed on the target partition 320 as part of the system image transfer. Alternatively, the MNS may be copied on the target partition from the default partition 310 or from another location by appropriate program module(s) or routine(s).

Referring back to FIG. 2, in one embodiment of the invention a library of system images 252 may be used for selecting and installing a target system image 322 on any one of the repurposable computers. The library may be stored on any suitable device that can be accessed and/or searched to retrieve a system image, e.g., a file server, a data base, a hard disk, ROM, RAM, etc. Instead of a centralized system image library 252, a pristine copy 332 of the system image used on a particular repurposable computer may be stored on the pristine partition 330 of the computer. Moreover, the pristine target system image 332 stored on each repurposable computer would be known to the aggregation node of each Pod in the network 200. Thus, instead of accessing a system image library 252, a computer that is to be repurposed (or purposed for the first time) may obtain a copy of the desired target system image 322 from any repurposable computer that has a pristine copy 332 of the desired target system image on its pristine partition 330.

An advantage of the present invention is that each system image in the library of system images 252 or on the pristine partition 330 may include a preconfigured copy of an operating system and one or more application programs that enable a computer to serve a particular purpose, i.e., to perform a particular task, role or function. Each of the system images in the library 252 or on the pristine partitions 330 may include one or more program modules that allow a unique security identifier to be generated when the system image is loaded on one of the repurposable computers to enable the computer to be registered as a trusted node on the secure network 200. The method and system for creating such system images is fully explained in currently pending patent application Ser. No. 09/410,197, entitled "System and Method for Regenerating and Reapplying a Unique Identifier for a Computer System," the entirety of which is hereby incorporated by reference.

Briefly, a computer with an existing operating system and application program is configured to execute a startup program on the next boot sequence. The image on the hard drive of the computer is duplicated to the library of system images 252 or to the pristine partition 330 and is available for loading on the target partition 320 of any of the repurposable computers. The startup program includes a security identification changer sequence and a setup wizard component. When a system image is transferred from the library of system images 252 or from a pristine partition 330 to the target partition 320 of a repurposable computer and the target partition is booted, the startup program completes necessary system configuration and any tasks required to make the repurposable computer unique. Making the repurposable computer unique may include generating a new, unique security identifier for the repurposable computer.

Those with ordinary skill in the art are aware of many different methods and/or protocols for implementing security identifiers depending on the network and/or operating system (e.g., SIDs in the WINDOWS® 2000 operating system). The term security identifier is herein used generically and encompasses any implementation that allows a computing device to be registered as a trusted node on a secure network environment.

Although the system images in the library 252 or on the pristine partition 330 may include a preconfigured copy of both an operating system and an application program, the invention is not so limited. For example, the system images in the library 252 or on the pristine partition 330 may be comprised of only an operating system(s), or only an application program(s). As another alternative, the system images in the library 252 or pristine partition 330 may be files that include only the changes that must be made to an existing system image 322 on the target partition 320 to repurpose the computer. Thus, instead of overwriting an existing system image on the target partition with a new system image that contains a complete, preconfigured operating system and application program, the invention may write to the target partition 320 one or more files that contain the necessary changes to the existing system image 322 on the target partition 320 to repurpose the computer.

In another embodiment of the invention, a system image may be modified and/or configured to create a specific system image for the computing device on which the system image is to be installed based on the hardware profile of the computing device, the function to be performed by the computing device, and/or any other appropriate or desired criteria. The system image may be specifically created for the computing device by any suitable service, program module or hardware device or combination thereof, and may consists of an operating system and perhaps one or more application programs appropriately configured. The hardware profile of the computing device may be ascertained in any suitable manner. For example, and not to limit the scope of the invention, the hardware profile of each computing device in the network may be stored in a database or file server. Alternatively, a program module (that may or may not be installed on the computing device at the factory) may ascertain and/or send the hardware profile of the computing device to the appropriate service, program module and/or hardware device. Thus, instead of choosing a system image from among a group of system images that already exist, the invention is broad enough to encompass modifying and/or configuring system images to create specific and/or unique system images for installation on computing devices Through the administrative console 270, a user may have complete operational control over any of the aggregation nodes and/or the network 200. By way of example, and not limitation, a user may be able to monitor the status of each node on the network, the purpose of each node on the network, the load on each node on the network, etc. The administrative console 270 also allows the user to initiate and/or monitor purposing or repurposing operations. For example, the user may select a system image from the library 252 or a pristine partition 330 and direct that the system image be installed on a particular one of the repurposable computers. Those with skill in the art will recognize that a user interface on the administrative console may have any appropriate or desired look and feel. Moreover, the invention is not limited to the use of an administrative console. For example, the monitoring and repurposing operations may be entirely automated without any user intervention. As another example, with appropriate input and output devices (e.g., a keyboard and a screen), the user can directly interface with any aggregation node, or any other node, in the network 200.

Figure 4:
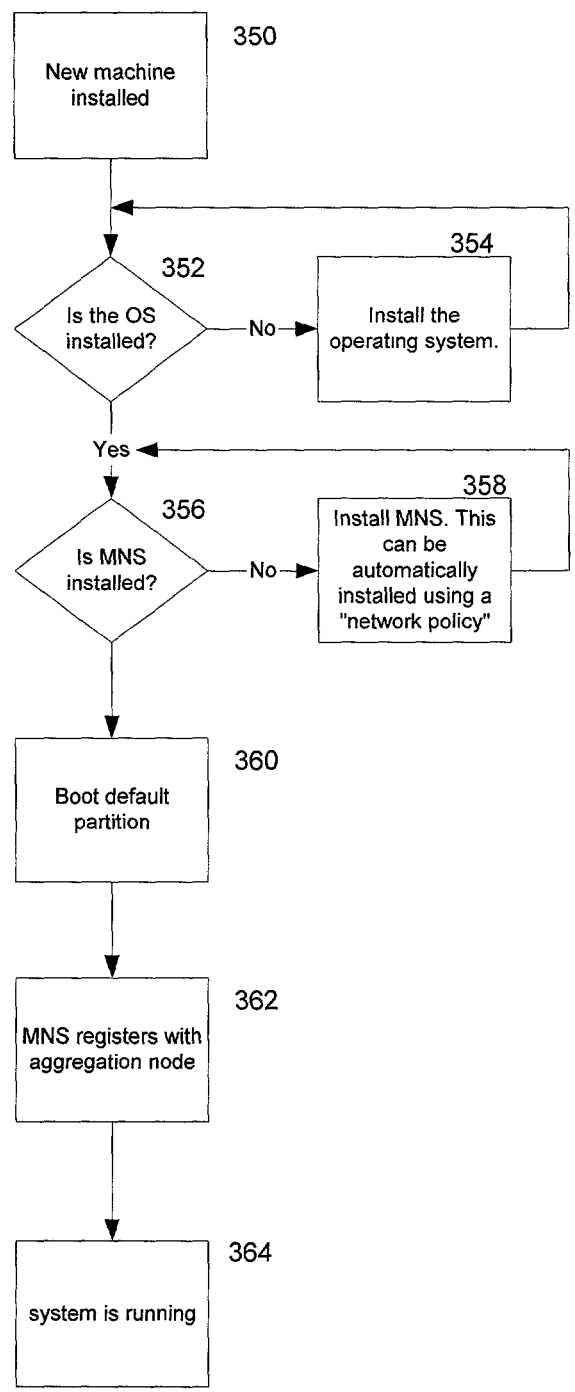
FIG. 4 is a flowchart of the steps performed to purpose a new computer added to the network.

Referring to FIG. 4, there is shown a flowchart of the steps that are performed when a new node is added to the network 200 shown in FIG. 2. For ease of reference, it is assumed that one of the unallocated pool of repurposable computers 234 is being added to the network 200 for the first time. At step 350 the repurposable computer 234 is connected to the network 200 through the network interface 170. The network interface may be, for example, a network adapter controller. The network interface 170 preferably incorporates facilities for automatically assigning the computer 234 a network identifier address. This function may be performed through alternative means, for example, a PROM.

At decision block 352, the invention checks whether a default operating system 312 already exists on the default partition 310 of the hard disk 142 of the computer 234. Such a check can be performed, for example, through a remote installation service 254. The remote installation service 254 may reside on a dedicated installation server, on any of the aggregation nodes, or any other suitable location or device on the network 200. The check at step 352 may also be performed by a program on a floppy disk, a CD-ROM, or in the ROM of the server. The remote installation service 254 allows the computer 234 that is added to the network 200 to find the installation service and remotely install a copy of a default operating system 312 on the default partition 310 of the hard disk 142 of the computer 234. If a default operating system does not already exist on the new computer 234, a copy is installed on the default partition of the computer 234 at step 354 using the installation service 254. Instead of a default operating system, the installation service 254 may install a copy of a default operating system and one or more application programs on the default partition 310.

The default operating system 312 installed on the hard disk 142 of the computer 234 need not be the same for each new computer added to the network 200. The installation service 254 may have the capability to select from different default operating systems to install on the hard disk 142. The particular default operating system that is installed on the new computer 234 may be selected using a network policy or other appropriate means.

Figure 5:
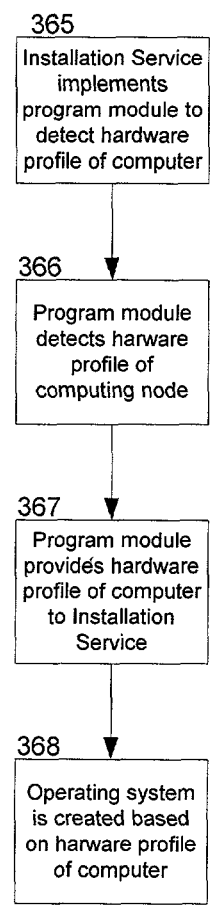
FIG. 5 is a flowchart of the steps performed to create a specific and/or unique operating system or system image based on the hardware profile of a computer or node on the network.

Alternatively, the default operating system may be specifically created for the computer based on the specific hardware profile of the computing device 234 added to the network 200. In such an embodiment, as shown in FIG. 5, at step 365, the installation service 254 implements a program module, service or hardware device (or any combination thereof) to detect the hardware profile of the computer 234. Such a program module, service and/or hardware device may reside on the installation service, already reside on the computer 234 or reside on any other node in the network 200. At step 366, the program module, service and/or hardware device detects the hardware profile of the computer 234 (i.e., the hardware components that comprise the computer 234) and at step 367 the program module, service and/or hardware device provides the hardware profile of the computer 234 added to the network 200 to the installation service 254. At step 368, an operating system is modified and/or configured to create a specific and/or unique default operating system for the newly added computing node 234 based on the hardware profile of the computing node. For example, the specific and/or unique default operating system may include the drivers and/or controllers needed for the specific hardware comprising the computing device, but not the drivers and controllers for hardware devices that are not part of the computing device. The specific and/or unique default operating system may be created by the installation service 254 or any other suitable service, program module or hardware device, or combination thereof. The specific and/or unique default operating system is thereafter installed on the computer 234. The specific and/or unique default operating system may also be created based, in whole or in part, on any other criterion or criteria. In yet another embodiment of the invention, the default operating system may be modified based on the hardware profile of the computer 234 after the default operating system is installed on the default partition of the computer.

An exemplary installation service 254 suitable for use in the present invention is provided in the Remote Installation Services (RIS) facility supported in the WINDOWS® 2000 operating system manufactured by Microsoft Corporation of Redmond, Wash. The RIS facility supported in the WINDOWS® 2000 operating system uses the Pre-Boot eXecution Environment (PXE) Dynamic Host Configuration Protocol (DHCP)-based remote startup technology to connect to a RIS server and start the installation process. Although the WINDOWS® 2000 operating system provides such an installation service, the invention is not limited to this specific implementation or this specific operating system. Instead, any facility for automatically installing and/or booting an operating system on a new computer added to a network is suitable for use in the present invention.

Returning to FIG. 4, at step 356 the invention checks whether a copy of the managed node service (MNS) 314 is installed on the default partition 310 of the hard disk 142 of the computer 234. If the MNS 314 is not installed on the computer 234, at step 358 the installation service 254 also installs a copy of the MNS 314 on the default partition 310 of the new computer 234. The MNS 314 maintains the computer system 234, including managing the target partition 320 and pristine partition 330, and providing the unique network identification for the computer 234 through the Network Interface Card (NIC) Media Access Control (MAC) identification. The invention may use the MAC ID to identify the computer 234 and the other nodes in the network 200, but is not limited to such an implementation and may use any appropriate identification system or procedure.

Once the default operating system 312 and MNS 314 have been installed on the computer 234, at step 360 the computer 234 boots from the default partition 310 using the default operating system 312. In one embodiment, at step 362, the MNS 314 registers the computer 234 with the aggregation node 232, which is the aggregation node for the Pod 230 comprised of the pool of unallocated repurposable computers. The registration process comprises any steps or tasks necessary to allow the aggregation node 232 to monitor and manage the computer 234 and to associate the computer 234 with the Pod 230. Thereafter, the MNS 314 communicates the status of the computer 234 to the aggregation node 232 from time to time. Alternatively, the MNS may register the newly added computer with any aggregation node or with no aggregation node at all. In yet another embodiment, the MNS can broadcast the availability of the computing device to the entire network (or just to the aggregation nodes).

At step 364 the computer is running the default operating system 312 (and perhaps one or more applications) on the default partition 310. The computer 234 will continue running the default operating system 312 on the default partition 310 until a repurposing operation is performed on the computer and a selected target system image 322 (from either the system image library 252, the pristine partition 330 of another repurposable computer, or any other suitable source) is installed on the target partition 320 of the hard disk 142 of the computer 234.

Figure 6:
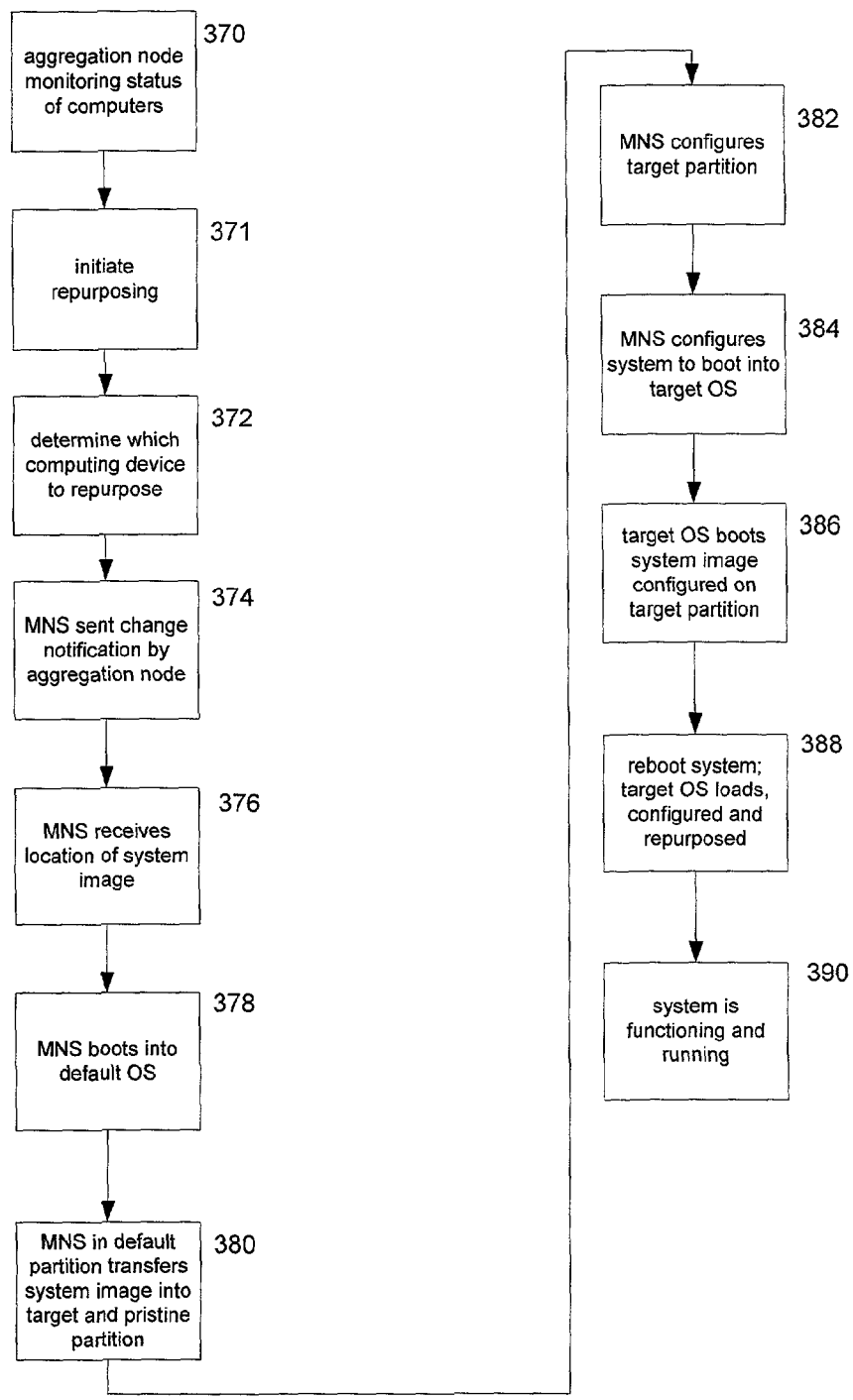
FIG. 6 is a flowchart of the steps performed to repurpose a computer in the network.

FIG. 6 is a flowchart representing the steps that are performed when one of the repurposable computers is to be repurposed (or purposed for the first time). For ease of reference, it is assumed that one of the web servers 214 for customer A is being repurposed as a web server 224 for customer B. The steps described, however, are also applicable for purposing one of the unallocated pool of repurposable computers 234 for the first time.

At step 370 aggregation node 222 is monitoring the status of the computers 224 purposed as web servers for customer B. At step 371 a repurposing (or purposing for the first time) operation is initiated. A repurposing (or purposing) operation may be initiated by a user through an administrative console 270, or by an automated process such as a load balancing program, an algorithm or a heuristic (not shown). The load balancing program may reside on a dedicated load balancing server (not shown), any and/or all aggregation nodes, or any other suitable location or device on the network 200. Initiating a purposing or repurposing operation is not limited to a load balancing program or a user. Indeed, any automated process, prompt, or manual process may be used to initiate a repurposing operation. For example, an aggregation node may automatically initiate a repurposing at a predesignated time of day, week, month or year. As another example, an aggregation node may use a heuristic or a predictive algorithm to initiate a purposing or repurposing operation.

At step 372, aggregation node 222 determines another repurposable computer that is available for repurposing (or purposing) to serve as a web server for customer B. Aggregation node 222 can make this determination in many different ways. For example, aggregation node 222 can broadcast a query to all other aggregation nodes to determine if any other Pods have any resources available for repurposing (or purposing for the first time). Aggregation node 222 can then select a repurposable computer based on the responses it receives. Alternatively, the aggregation node 222 can sequentially poll each of the other aggregation nodes to determine which Pod of computing devices has any repurposable computers available. Indeed, aggregation node 222 can even broadcast a query to every computing node on the network or poll each computing node on the network, although this method could potentially be slower and consume more network resources. It should be understood that the invention is not limited to any particular method, software or hardware for aggregation node 222 to identify a computing device that is available for repurposing (or purposing for the first time) as a web server for customer B.

For the purpose of this discussion, it is assumed that one of the repurposable computers 214 is identified as available for repurposing. It is to be understood that any node in the network 200 potentially may be identified as available for repurposing. Once an available computing device is identified, at step 374, the aggregation node 222 sends the MNS 314 on the repurposable computer 214 a notification that a repurposing operation is to commence. As part of the repurposing operation, the aggregation node 222 sends the MNS 314 on the repurposable computer 214 the location that the MNS 314 can find the new target system image 322 that is to be installed on the target partition 320 of the computer 214. The location of the new target system image that is provided to the computer 214 can be the pristine partition 330 of any repurposable computer that has a pristine target system image 322 of customer B's web server or the system image library 252 that may have a copy of the target system image for customer B's web server. The MNS receives this location at step 376.

In another embodiment, a specific and/or unique target system image may be created based on the hardware profile of the repurposable computer using steps similar to those set forth in FIG. 5. Thus, for example, a program module, service and/or hardware device may detect the hardware profile of the repurposable computer and provide the hardware profile to any suitable service, program module and/or hardware device to create a specific and/or unique target system image for the repurposable computer by modifying and/or configuring an operating system and perhaps one or more application programs based on the hardware profile of the repurposable computer. The specific and/or unique target system image may also be created based, in whole or in part, on any other criterion or criteria, for example, the purpose to be performed by the repurposable computer. The specific and/or unique target system image may then be installed on the target partition of the repurposable computer. In yet another embodiment, the target system image may be modified based on the hardware profile of the repurposable computer after the target system image is installed on the target partition.

At step 378, the MNS boots the computer 214 from the default operating system 312 that is installed on the default partition 310. Step 378 is unnecessary if the computer system is being purposed for the first time. Once the computer 214 has booted from the default operating system 312 on the default partition 310, at step 380, the MNS transfers a copy of the pristine selected target system image into the target partition 320 and the pristine partition 330 of the computer 214 using the image transfer engine 316. The image transfer engine may, for example, perform a binary transfer (e.g., copy) of the selected system image.

At step 382 the MNS performs additional configuration functions on the target partition 320 to allow the computer 214 to boot from the target partition 320. As an example, on a computer system running the WINDOWS® NT or the WINDOWS® 2000 operating system, this might be implemented by resetting the boot.ini file appropriately. The MNS may also, for example, remove the existing target partition 320 and pristine partition 330 and recreate them based on the size of the target system image 322 being installed on the hard disk 142. The MNS may receive the information about the size of the target system image from the aggregation node 222 or some other appropriate source. Thereafter, at step 384 the MNS changes the master boot record 300 so that the next time the computer 214 boots, the boot process is conducted from the target partition 320 and the new target system image 322 installed thereon.

When the computer 214 boots again at step 386, the new target system image 322 is automatically set up on the target partition 320 of the computer 214. As part of step 386, a new unique security identifier may be generated and assigned to the computer 214. During this step, the MNS or any other appropriate service, subroutine, program or module also changes any appropriate network policies, directories, routing addresses, etc. such that the computer 214 that is being repurposed is associated with Pod 220 instead of Pod 210 and, consequently, thereafter monitored and controlled by aggregation node 222 instead of aggregation node 212. Once the new target system image 322 is successfully set up on the target partition 320, at step 388, the computer 214 reboots one more time from the target partition 320 to run the operating system and application program. At step 390, the repurposable computer 214 has been successfully repurposed as a web server 224 for client B and been associated with Pod 220. Although the steps of this repurposing operation have been described in a particular order, those with ordinary skill in the art recognize that the steps may be performed in any order as long as repurposable computer is successfully repurposed (or purposed for the first time) as desired.

The invention also encompasses a system and method in which steps 370 to 376 and 380 to 382 of FIG. 6 are performed as a background process. In this manner, the aggregation node 222 can use excess network bandwidth and the individual repurposable computer 214 can use excess processing capacity to be ready for a repurposing operation when necessary. The repurposable computer 214 will continue to function as a web server for customer A while steps 370 to 376 and 380 to 382 are performed as a background process. In such an implementation, the MNS on the target partition 320 is used to accomplish the image transfer of step 380. Additionally, for such an implementation to be possible, the computer 214 has more than one target partition and the new target system image is copied or transferred to a target partition that is not the active partition.

With such an implementation, instead of initiating a repurposing operation only after identifying that such an operation is necessary, a load balancing algorithm, heuristic or other automated or manual process may anticipate that a repurposing operating may be necessary in the future. The invention can then perform steps 370 to 376 and 380 to 382 as a background process so that the computer is ready to reboot to be repurposed when desired. Once a repurposing operation is to be performed, all that remains is for the repurposable computer to perform steps 378 and 384 to 390.

Additionally, if a Pod is organized such that it includes computers that have different purposes (e.g., a group of computers that function as web servers for customer A and a group of computers that function as web servers for customer B), the aggregation node may optimize or repurpose resources from within the Pod without having to communicate with, or draw resources from, the rest of the network.

Moreover, in one embodiment of the invention, each node or computing device on the network 200 may have two network interfaces 170, for example, a network interface card (NIC). One network interface card can be used exclusively for communications within the Pod to which the computing device belongs (i.e., the Pod with which the computing device is associated) and the other network interface card can be used to communicate across the entire network. In this manner, the routine communications within a Pod do not affect communication load across the entire network 200.

Although the invention has been described above with respect to a typical implementation in the network of an ISP data center, the invention is applicable to any computer network regardless of the physical design of the network, the overall purpose of the network or the purpose of each of the individual nodes within the network. A network incorporating the invention need not have any and/or all of the devices comprising the Pod 240 in the embodiment shown in FIG. 2.

The invention is intended to encompass a network in which any node on the network can be dynamically purposed or repurposed. By way of example and not limitation, the SQL servers 244 may be repurposed as a web server 224 for customer B, or vice versa.

Moreover, the invention is not limited to a group of repurposable computers that function as web servers. In fact, the computers may be purposed to perform any logical or computational steps. The purposes served by the group of repurposable computers is particularly broad because any system image comprised of an operating system and perhaps at least one application program can be loaded and run on one of the computers in the group of repurposable computers.

It is to be understood that the invention is broad enough to encompass Pods that are comprised of any number of computers. For example, Pods may include as many computers that can be networked together based on software and/or hardware limitations and as few as one computer. If a Pod is comprised of one computing device, then the computing device will function as its own aggregation node. Ideally, however, one would design or choose the number of Pods (and corresponding aggregation nodes) for maximizing efficiency while at the same time minimizing network communication traffic. The invention is also broad enough to encompass Pods with more than one aggregation node. For example, a first aggregation node may act as the primary aggregation node with at least one computing device purposed to act as a secondary or back-up aggregation node.

Additionally, the aggregation nodes are not limited to an implementation on a conventional computer 100 or the like. In fact, one or more of the components comprising the aggregation nodes may be implemented on any device capable of performing the tasks and functions discussed above, e.g., a network interface card, an optical storage medium, a network router, mobile or cellular device, etc. Additionally, the network high speed switching fabric 260 is not limited to a hard wired implementation. Alternatively, for example, the network fabric 260 may be implemented over a wireless or satellite network system as long as the appropriate functionality is achieved.

The invention is also broad enough to allow for copying of system images from a computing device in the network and store them on the system image library 252 for transfer to other computing devices. By way of example and not limitation, suppose a computing device is added to the network 200 containing a system image that does not already exist in the system image library 252. An aggregation node, for example, can copy the new system image that resides on the computing device and store it in the system image library. The system image will then be available for future transfer to another node in the network.

In addition to dynamically repurposing computing devices in a network, the invention can be used to initially purpose computing devices as they are added to the network. The invention, therefore, eliminates the need to remove a hard disk from the computer, "burn" a system image on the hard disk, and reinstall the hard disk in the computer.

Moreover, the invention allows for easy recovery in the event of a failure or error. If the repurposable computer experiences an error or failure while running the target system image 322 on the target partition 320, the repurposable computer can be set to automatically reboot using the default operating system 312 on the default partition 310. The MNS 314 can then communicate with the aggregation node of the Pod to which the repurposable computer belongs to inform the aggregation node that the repurposable computer experienced an error and needs to be repurposed. Alternatively, the MNS can copy the pristine target system image 332 on the pristine partition 330 on to the target partition 320 and reboot the computing device appropriately.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for preparing a computing device that is purposed to perform a first function to be purposed to perform a second function by operating with a new target system image, the computing device having a computer readable storage medium comprising a first target partition and a second target partition, wherein the first target partition is the active partition and the computing device is connected to a network, the method comprising the steps of:
   receiving a prompt to initiate a repurposing operation generated by an aggregation node; and
   transferring the new target system image to the second target partition, whereby the computing device continues to perform the first function while the steps of the method are performed.

2. The method of claim 1 further comprising configuring the second target partition.

3. The method of claim 1, further comprising receiving the location on the network of a new target system image.

4. The method of claim 3, wherein the location on the network of the new target system image is a pristine partition of a second computing device.

5. The method of claim 3, wherein the location on the network of the new target system image is a library of at least one system image.

6. The method of claim 1 further comprising the following steps for dynamically preparing an operating system for the computing device based on a hardware profile of the computing device:
   running a program module to determine the hardware profile of the computing device;
   providing a specific operating system based on the hardware profile of the computing device; and
   creating the new target system image using the specific operating system.

7. The method of claim 6, further comprising installing the program module to determine the hardware profile of the computing device on the computer readable storage medium on the computing device.

8. The method of claim 6, wherein the specific operating system is installed on the second target partition, the method further comprising the step of booting the computing device from the second target partition having the specific operating system.

9. A system for dynamically repurposing at least one computing device in a network of computing devices, comprising:
   a first Pod of computing devices comprised of at least a first computing device purposed to perform a first task; the at least first computing device including a computer readable storage medium comprising a default partition, a target partition and a pristine partition;

a second Pod of computing devices comprised of at least a second computing device purposed to perform a second task; the at least second computing device including a computer readable storage medium comprising a pristine partition having a pristine copy of a target system image;

at least one aggregation node for monitoring the first Pod of computing devices and for managing the transfer of the pristine copy of the target system image from the pristine partition of the second computing device to the target partition of the first computing device; and a communication infrastructure for linking the aggregation node and the first and second Pods of computing devices.

10. The system of claim 9, wherein the default partition of the first computing device comprises:

a default operating system; and a service for communicating the current status of the first computing device to the first aggregation node and for receiving and booting from the target partition the pristine copy of the target system image received from the pristine partition of the second computing device.

11. The system of claim 10, further comprising an installation service for installing on the default partition of the first computing device a default operating system and a service for communicating a status of the first computing device to the first aggregation node.

12. The system of claim 9, further comprising an image transfer engine for transferring the pristine copy of the target system image from the pristine partition of the second computing device to the target partition of the first computing device.

13. The system of claim 9, wherein the pristine copy of the target system image is comprised of at least one operating system and at least one application program.

14. The system of claim 9, wherein the at least first computing device and the at least second computing device each further comprise at least one network interface to the communication infrastructure.

15. The system of claim 14, wherein the at least first computing device and the at least second computing device each comprise two network interfaces to the communication infrastructure.

16. The system of claim 14, wherein the communication infrastructure is a local area network.

17. The system of claim 14, wherein the communication infrastructure is a wireless network.

\* \* \* \* \*